United States Patent [19]
Jezo

[11] 3,816,828
[45] June 11, 1974

[54] ECHO PROTECTION FOR TACAN/DME
[75] Inventor: Maurice L. Jezo, Cedar Grove, N.J.
[73] Assignee: International Telephone and Telegraph Corporation, Nutley, N.J.
[22] Filed: May 16, 1972
[21] Appl. No.: 253,715

[52] U.S. Cl. ............................................ 343/6.5 LC
[51] Int. Cl. ................................................ G01s 9/56
[58] Field of Search ........ 343/6.5 R, 6.5 LC, 6.8 R, 343/6.8 LC

[56] References Cited
UNITED STATES PATENTS
| | | | |
|---|---|---|---|
| 3,349,402 | 10/1967 | Foster | 343/6.5 R |
| 3,643,256 | 2/1972 | Owen | 343/6.5 R |
| 3,646,556 | 3/1970 | Bishop | 343/6.5 R |
| 3,680,090 | 7/1972 | Bishop | 343/6.5 LC |
| 3,715,750 | 2/1973 | Bishop | 343/6.5 R |

Primary Examiner—Benjamin A. Borchelt
Assistant Examiner—H. A. Birmiel
Attorney, Agent, or Firm—John T. O'Halloran; Menotti J. Lombardi, Jr.; Vincent Ingrassia

[57] ABSTRACT

This invention relates to a method and apparatus for inhibiting the receiver of a Tactical Air Navigation (TACAN) system from responding to invalid interrogations (echoes). First and second dead time gates are generated. The second dead time gate has a fixed duration and is jittered within a predetermined time range. Each dead time gate is used to inhibit the beacon receiver from responding to an invalid interrogation.

6 Claims, 6 Drawing Figures

ECHO PROTECTION FOR TACAN/DME

BACKGROUND OF THE INVENTION

This invention relates to a method and apparatus for inhibiting the receiver of a Tactical Air Navigation (TACAN) system from responding to invalid interrogations.

A TACAN system of the type described in MIL-STD 291B, receives interrogation signals from airborne transponders. However, the receiver is interested only in the interrogation signals which propagate along the direct path from the aircraft to the ground beacon, and not in echoes or reflections of the interrogation which arrive at the ground beacon via multipath propagation, i.e., reflected off the surface of the earth or buildings, vehicles, etc. to the ground beacon.

In order to protect TACAN systems against such echoes, the receivers of TACAN and DME transponders are disabled for a fixed period of time (dead time) which follows each decoding of an interrogation. When echoes last for a long time at a high level, a long dead time is necessary. A disadvantage of a long dead time is a high countdown of bonafide interrogations which impairs system traffic capacity. (Countdown refers to the rate at which decoded interrogations are not responded to.)

It has been proposed to vary the duration of the dead time gate between two extreme values, the result being a larger echo countdown. However, this method has the disadvantage that the average dead time is somewhat greater than it would be without jitter because the minimum dead time has to be the same in both cases. For example, it has been found that efficient protection against echoes is obtained with a 50 percent countdown. If the trailing edge of the dead time gate uniformly distributed between 60 microseconds and 200 microseconds there results an over-protection near 60 microseconds and under-protection near 200 microseconds. For normal interrogations, the countdown is that of a fixed dead time gate of 130 microseconds.

The above described multipath propagation can cause DME errors and false DME lock-ons.

SUMMARY OF THE INVENTION

It is an object of the present invention to provide a method and apparatus for minimizing the effects of air-to-ground multipath signals.

It is a further object of the present invention that the echo suppression system proposed provides controls that permit the sensitivity time characteristics of the receiver, following the reception of a pulse, to be tailored to the echo characteristics of the beacon site.

According to a broad aspect of the present invention there is provided a method of inhibiting the receiver of a Tactical Air Navigation system from responding to invalid interrogations comprising receiving signals in a receiver, decoding said signals which represent interrogations, generating a first dead time gate having a predetermined duration, said first dead time gate beginning immediately after the decoding of an interrogation, inhibiting said receiver from decoding any further interrogations received during the time duration of said first dead time gate, generating a second dead time gate having a predetermined duration within a predetermined time range, said time range having a beginning which is time delayed from said decoding by a fixed amount and inhibiting said receiver from decoding any further interrogations during the time duration of said second dead time gate.

According to a further object of the present invention there is provided an apparatus for inhibiting the receiver of a Tactical Air Navigation system from responding to invalid interrogations comprising a receiver for decoding interrogations, first means coupled to said receiver for generating a first dead time gate, second means coupled to said first means for generating a second dead time gate and means coupled to said first means and said second means for combining said first dead time and said second dead time, said combining means coupled to said receiver for inhibiting any further decoding of interrogations during the time duration of either said first or second dead time gate.

The above and other objects of the present invention will be better understood from the following detailed description taken in conjunction with the accompanying drawings in which:

DESCRIPTION OF THE PREFERRED EMBODIMENT

Echoes of interrogations can be divided into two categories. The first are specular reflections which arise from large areas. The receiver output, due to specular reflection, resembles decaying noisy CW. In severe cases, echoes can remain above the noise level for several hundred microseconds.

Specular reflections cause problems with some beacons because their design is such that at the end of the dead time, they abruptly return to full sensitivity. The resulting gated echo is then interpreted by the video circuits as a leading edge of an interrogation, and a spurious reply, following the true reply by the dead time, is transmitted. Several consecutive spurious replies can result from each strong interrogation. This is an undesirable situation because erroneous information is being transmitted which an airborne set can lock-onto, and the beacon duty cycle capability is being used up.

Lengthening the dead time gate is a poor solution for this problem as the standard pulse distribution can no longer be maintained in heavy traffic conditions, and countdown becomes excessive. It creates excessive dead time, even for an interrogation just above the noise, which has no detectable echo.

As will be shown, the time characteristics of the receiver, following the reception of a pulse, can be tailored to the echo characteristics of the beacon site according to this invention. This permits receiver blanking, following the reception of a pulse, without receiving the specular reflection due to the pulse.

The second category of echoes are point reflections from a single area which is normally relatively small. The resulting echo is a decent delayed replica of the interrogation. Such reflections have been observed to last for a long time after the real interrogation with amplitudes within a few db of the true interrogation. Further protection in these cases can be attained by jittering the trailing edge of the dead time. Jittering makes the spurious replies to the aircraft non-synchronous, thus greatly reducing the possibility of an airborne lock-on spurious reply. As stated above, a disadvantage of this method is that the average dead time is somewhat greater than it would be without jitter because the minimum dead time must be the same in both cases.

Figure 1:
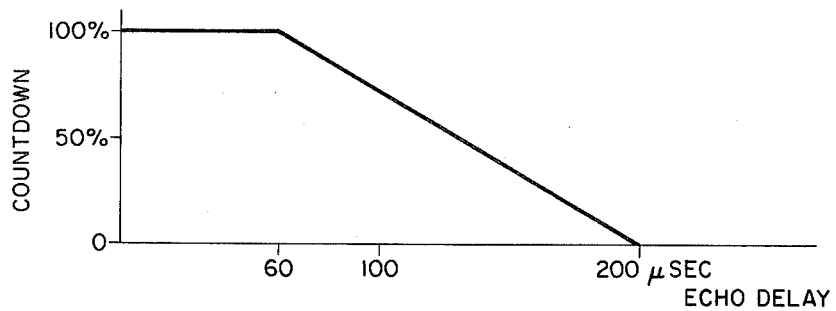
FIG. 1 shows an example of countdown as a function of delay for a dead time gate having a trailing edge jitter between 60 and 200 microseconds.

It should be noted that simple jittering of the trailing edge of the dead time gate increases the countdown of the echo depending upon the delay with respect to the interrogation. When this delay is just larger than the minimum dead time, the countdown is close to 100 percent. When the delay is just smaller than the maximum value, the countdown is close to 0. An example of this is shown in FIG. 1. In this case, the trailing edge of the dead time gate jitters between 60 and 200 microseconds.

Since efficient protection against echoes is obtained with 50 percent countdown, one can see from FIG. 1 that there is over protection near 60 microseconds and under protection near 200 microseconds delay. The curve shown as FIG. 1 corresponds to a fixed dead time gate of 130 microseconds having a 50 percent countdown capability.

The invention proposes the use of two dead time gates to improve the above-described situation. The first gate is the regular dead time gate following the interrogation decode shown in FIG. 2a. This gate normally provides for 60 microseconds dead time. The second gate is of a fixed duration and its position is jittered between two predetermined limits suitable for the particular echo situation of the beacon site.

Figure 2A:
FIG. 2a illustrates the timing relationship between decoding of an interrogation and the first and second dead time gates according to the present invention.
Figure 2B:
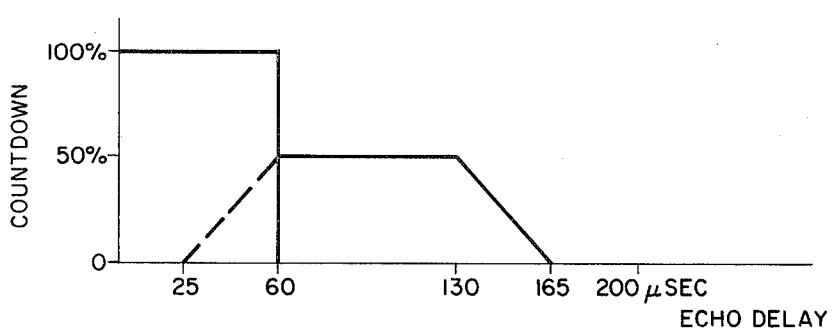
FIG. 2b shows the countdown as a function of delay when using a trailing edge second gate which is 35 microseconds wide and is jittered between 25 microseconds and 130 microseconds.

FIG. 2b shows the countdown as a function of delay when using a trailing edge second gate, shown in FIG. 2a, which is 35 microseconds wide and is jittered between 25 and 130 microseconds. The echo protection is the same as in the previous example since the countdown of the echoes is 50 percent but the countdown for real interrogation corresponds to a fixed dead time gate of 103.75 microseconds.

Figure 3:
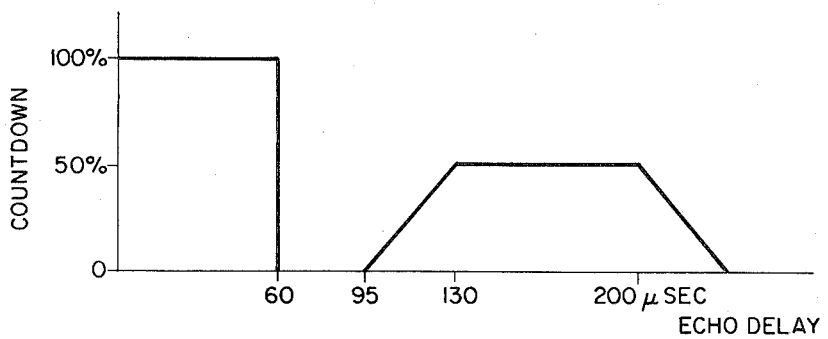
FIG. 3 shows countdown as a function of delay in which the echo rejection is set for an echo having delays between 130 and 200 microseconds.

FIG. 3 shows that this technique allows for tailoring the echo rejection to each site. In the curve shown in FIG. 3, the echo rejection is set for an echo having delays between 130 and 200 microseconds.

Figure 4:
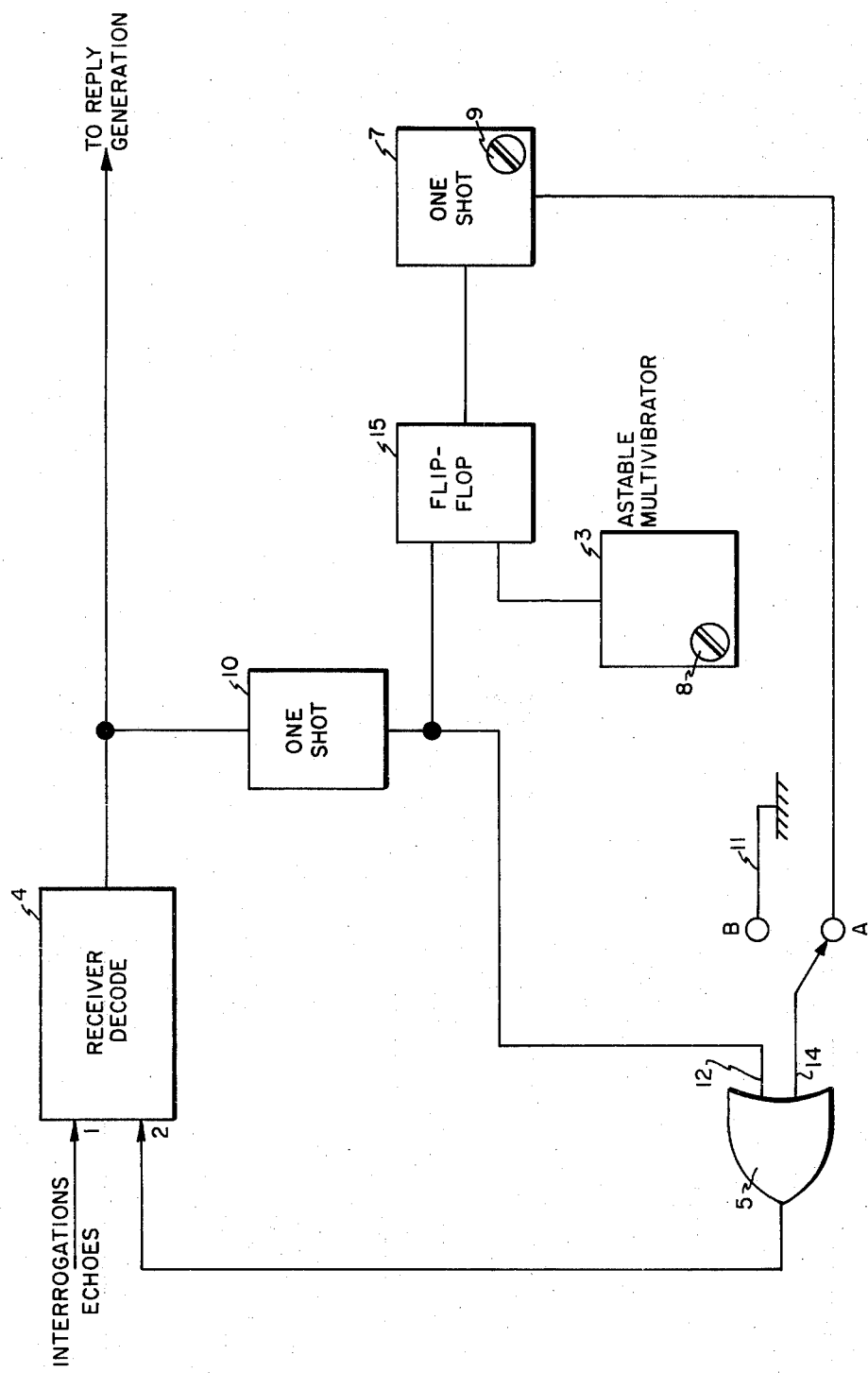
FIG. 4 is a functional block diagram of a circuit which provides first and second dead time gates according to the invention.
Figure 5:
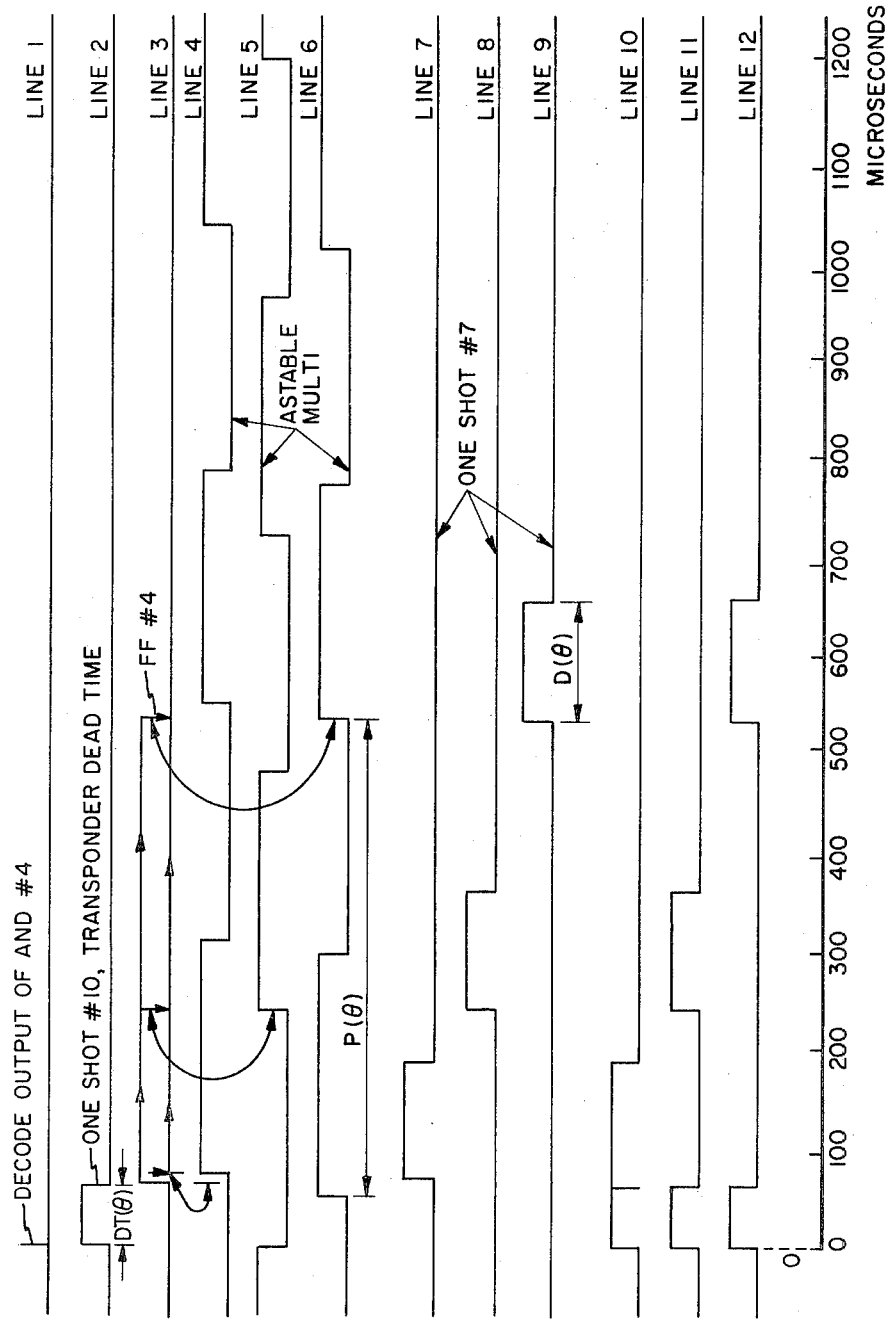
FIG. 5 is a timing diagram illustrating the generation of first and second dead time gates by the circuit shown in FIG. 4.

Referring to FIG. 4, interrogations and echoes are applied to receiver decode unit 4 on terminal 1. The decoded output of receiver decode unit 4 is shown on line 1 of FIG. 6. This output triggers one shot 10, shown on line 2 of FIG. 5, and corresponds to the first transformer dead time gate. The trailing edge of the signal generated by one shot 10 sets flip-flop 15. Flip-flop 15 remains set until reset by the rising edge of free running astable multivibrator 3. As there is no coherence between the astable multivibrator 3 and one shot 10, successive set times of flip-flip 15 very randomly. Distribution of the set times is linear, with limits of 0 to the period P, of astable multivibrator 3. Three different up times are shown on line 3 of FIG. 5 for the three astable multivibrator phases shown on lines 4, 5 and 6 of FIG. 5. A potentiometer 8 provides adjustment of the jitter range by varying the period P of astable multivibrator 3. The jittered trailing edge of flip-flop 15 triggers one shot 7, whose duration d is adjustable by means of potentiometer 9. The outputs of one shot 7, which corresponds to the second dead time gate, and one shot 10 drive OR gate 5 whose output is coupled to terminal 2 of receiver decode unit 4 and inhibits receiver response. The output of one shot 7 for the three different astable multiphases are shown on lines 7, 8 and 9 of FIG. 5. The corresponding outputs of OR gate 5 are shown on lines 10, 11 and 12 of FIG. 5.

The jitter can be disabled by disconnecting the input terminal 14 of OR gate 5 by means of dead time jitter switch 11.

It is to be understood that the foregoing description of specific examples of this invention is made by way of example only and is not to be considered as a limitation on its scope.

I claim:
1. An apparatus for inhibiting the receiver of a Tactical Air Navigation system from responding to invalid interrogations comprising:
   a receiver for decoding interrogations;
   first means coupled to said receiver for generating a first dead time gate;
   second means coupled to said first means for generating a second dead time gate;
   means coupled to said first means and said second means for combining said first dead time and said second dead time, said combining means coupled to said receiver for inhibiting any further decoding of interrogations during the time duration of either said first or second dead time gate; and
   means for varying the delay between the beginning of said first dead time gate and the beginning of said second dead time gate, said means for varying including
   a flip-flop having set and reset input terminals, said set terminal coupled to the output of said first means, and having an output coupled to the input of said second means; and
   an astable multivibrator having an output coupled to said reset terminal.
2. An apparatus according to claim 1 wherein said first means is a one shot.
3. An apparatus according to claim 1 wherein said second means is a one shot.
4. An apparatus according to claim 3 wherein said one shot is coupled to a potentiometer for varying the duration of said second time gate.
5. An apparatus according to claim 1 wherein said combining means is an OR gate having its first input coupled to the output of said first means and its second input coupled to the output of said second means.
6. An apparatus according to claim 1 wherein said astable multivibrator is coupled to a potentiometer for varying the period of the output of said astable multivibrator.

* * * * *